(12) United States Patent
Streuer et al.

(10) Patent No.: US 7,897,275 B2
(45) Date of Patent: Mar. 1, 2011

(54) ELECTRICAL RECHARGEABLE BATTERY

(75) Inventors: Peter Streuer, Hannover (DE);
Christian Rosenkranz, Wunstorf (DE);
Gerolf Richter, Hildesheim (DE)

(73) Assignee: VB Autobatterie GmbH & Co. KGaA, Hannover (DE)

( * ) Notice: Subject to any disclaimer, the term of this patent is extended or adjusted under 35 U.S.C. 154(b) by 1305 days.

(21) Appl. No.: 10/273,094

(22) Filed: Oct. 17, 2002

(65) Prior Publication Data

US 2003/0077483 A1    Apr. 24, 2003

(30) Foreign Application Priority Data

Oct. 19, 2001   (DE) ................... 101 52 684

(51) Int. Cl.
*H01M 2/34* (2006.01)
(52) U.S. Cl. ................. 429/1; 429/65; 429/121
(58) Field of Classification Search ............... 429/1, 65, 429/121, 163, 175, 178, 181, 182
See application file for complete search history.

(56) References Cited

U.S. PATENT DOCUMENTS

| | | | | |
|---|---|---|---|---|
| 2,159,034 A | * | 5/1939 | Matthews | 429/1 |
| 4,239,322 A | * | 12/1980 | Gordon, Jr. | 439/458 |
| 4,693,948 A | * | 9/1987 | McEwan | 429/121 |
| 5,021,305 A | * | 6/1991 | Turner | 429/65 |
| 5,525,438 A | * | 6/1996 | Kostrivas et al. | 429/87 |

FOREIGN PATENT DOCUMENTS

| | | |
|---|---|---|
| DE | 26 45 977 C3 | 4/1978 |
| DE | 28 14 444 C2 | 7/1979 |
| DE | 35 45 522 C2 | 6/1986 |
| EP | 1 304 751 A3 | 4/2003 |
| FR | 2 395 610 | 1/1979 |

OTHER PUBLICATIONS

European Office Action dated May 13, 2005 for EP 1 304 751 (5 pages).

* cited by examiner

*Primary Examiner* — R. Hodge
(74) *Attorney, Agent, or Firm* — Lathrop & Clark LLP

(57) ABSTRACT

An electrical rechargeable battery having positive and negative electrodes arranged in a housing with separators between them, and having an electrolyte, at least one end pole is surrounded by a contact protection device in the form of a wall which surrounds the end pole, can rotate freely and is composed of insulating material. Electrical contact can be made only from above through a slot in the contact protection device, which surrounds the end pole. The end pole is protected against direct contact from above by means of an electrically insulating pole cap, which is screwed to the end pole.

15 Claims, 2 Drawing Sheets

ELECTRICAL RECHARGEABLE BATTERY

RELATED APPLICATION

This patent application claims the benefit of German Patent Application No. DE 101 52 684.9, filed Oct. 19, 2001.

FIELD OF THE INVENTION

This invention relates to an electrical rechargeable battery having positive and negative electrodes arranged in a housing with separators between them, and having an electrolyte and at least one end pole. The batteries of the invention are preferably used for starter batteries for motor vehicles.

BACKGROUND

End poles and cable connections for electrical rechargeable batteries, in particular, for starter batteries, are known in various embodiments.

DE 26 45 977 C3 discloses a pole connection for batteries which can be plugged onto a cylindrical end pole and comprises an internally smooth plug socket with longitudinal slots.

DE 28 14 444 C2 discloses the design of an end pole with an external thread onto which either a cable lug with an internal thread is screwed, or a cable lug is firmly clamped by means of a nut. A rubber cap is pulled over the cable connection to form a cover and a seal.

An end pole with an external thread which is screwed to flat cable lugs is disclosed in DE 354 55 22 C2. This rechargeable battery has a housing with two connections. The shape of an electrically insulating wall ensures that each pole can be connected only to the associated cable lug.

These arrangements have the disadvantage that they project beyond the battery cover outline, and can thus easily be damaged during stacking of batteries. Before and during assembly and installation of the electrical rechargeable batteries, there is inadequate protection against direct contact, as is particularly important for relatively high operating voltages. The cable routing is governed by the shape of the end pole.

It would accordingly be advantageous to provide a rechargeable battery having an end pole which does not project beyond the battery cover outline, is very largely protected against direct contact with a cable connection being routed in a flexible manner, which can be produced easily, and which can also be assembled and installed easily.

SUMMARY OF THE INVENTION

This invention is directed to a battery including a housing, positive and negative electrodes arranged in the housing, separators located between the electrodes, electrolyte in the housing, at least one end pole associated with one of the electrodes, and a contact protection device comprising a rotatable wall surrounding the end pole and composed of insulating material, the contact protection device having at least one slot sized and shaped to receive a connecting cable.

BRIEF DESCRIPTION OF THE DRAWINGS

The construction and method of operation of the rechargeable battery according to the invention will be explained in the following text with reference to the figures.

DETAILED DESCRIPTION

Figure 1:
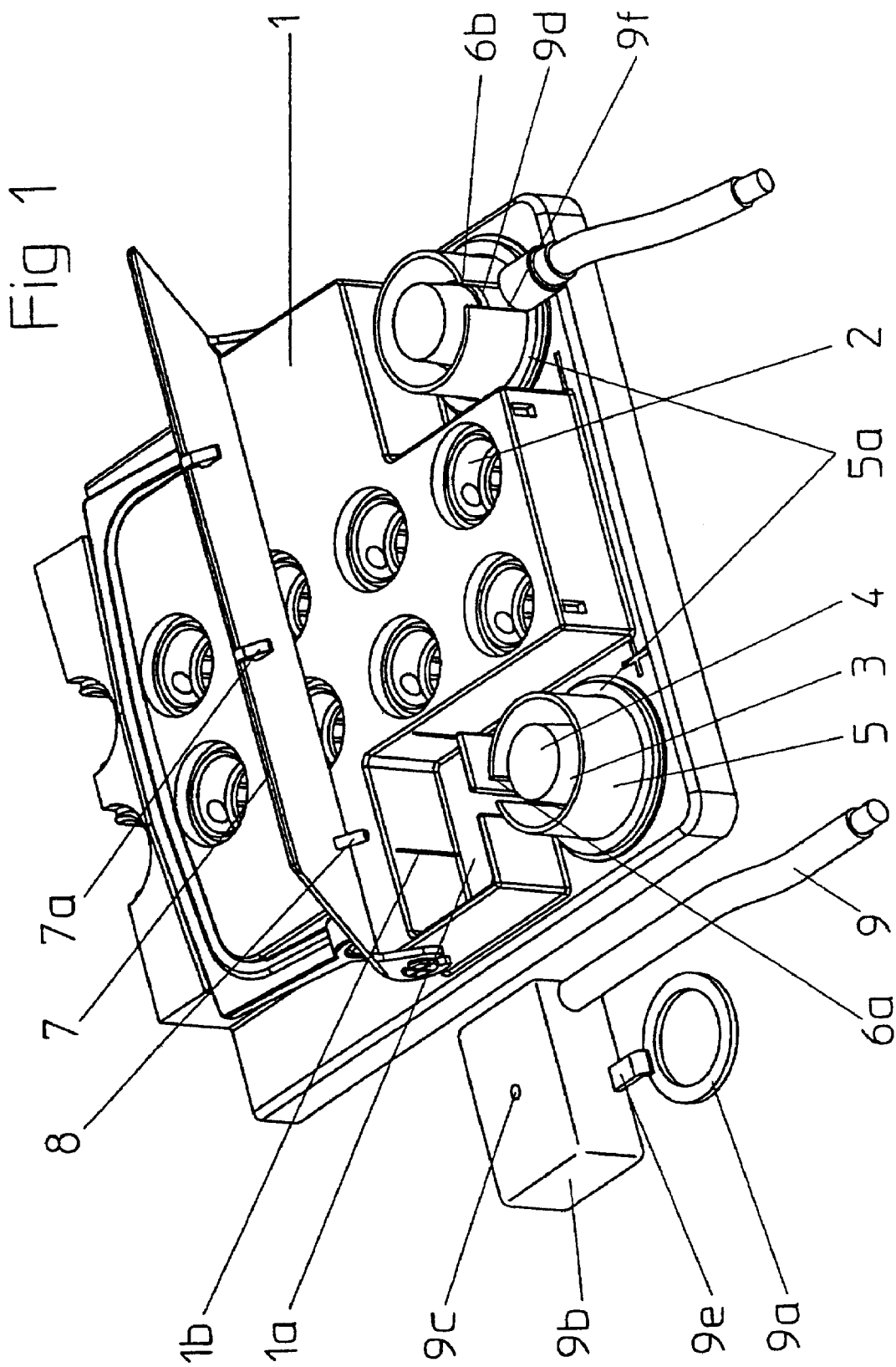
FIG. 1 is a schematic perspective view of a battery cover with the poles according to the invention.

It will be appreciated that the following description is intended to refer to specific embodiments of the invention selected for illustration in the drawings and is not intended to define or limit the invention, other than in the appended claims.

When using an electrical rechargeable battery with the configuration of the battery poles according to the invention, this reliably prevents confusion with a rechargeable battery type of different voltage and confusion between the electrical poles. The rechargeable battery poles are designed to prevent direct contact, and cannot be connected to the poles of other rechargeable batteries, for example, by means of conventional jump-starting cables.

A particular advantage of the invention is that, when producing the terminal connection using a metal tool, there is no more risk of an electrical short circuit occurring than when using manually operated electrically insulated plug connectors.

As shown in FIG. 1, the end pole 3 is arranged on the cover 1, which also contains typical filling openings 2. A cylindrical contact protection device 5, which can rotate freely, in the form of a wall which surrounds the end pole 3 shields the end pole 3 on all sides in such a way that the end pole is accessible only from above and via narrow, vertical slots 6a and 6b in the surrounding contact protection device 5, which is composed of electrically insulating plastic. An annular cable lug 9a or 9d is used as the cable connection, which engages over the end pole 3 and allows contact with the end pole 3 during the contact-making process and after passing an electrically insulating pole cap 4. The annular cable lug is preferably attached by means of a screw cap 10 (FIG. 2b), which is not shown in the overall view. The contact protection device is held in a mounting ring 5a, which is provided on the cover 1, or in attachment claws which are integrally formed on the cover 1.

Figure 2A:
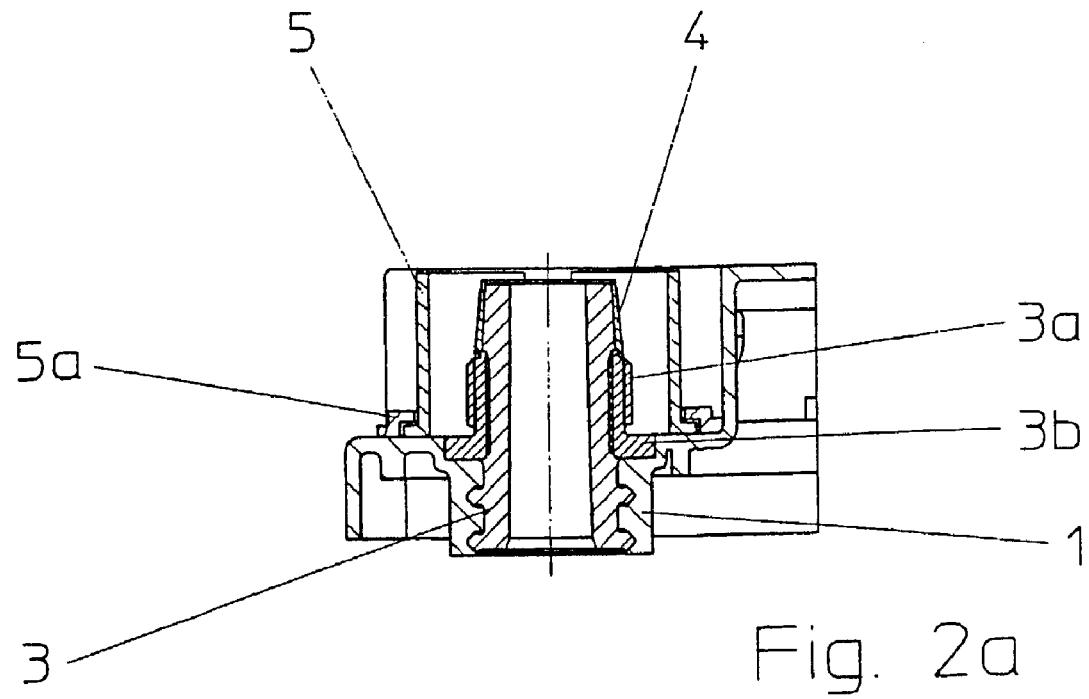
FIG. 2a is a sectional view of a battery pole in accordance with aspects of the invention.
Figure 2B:
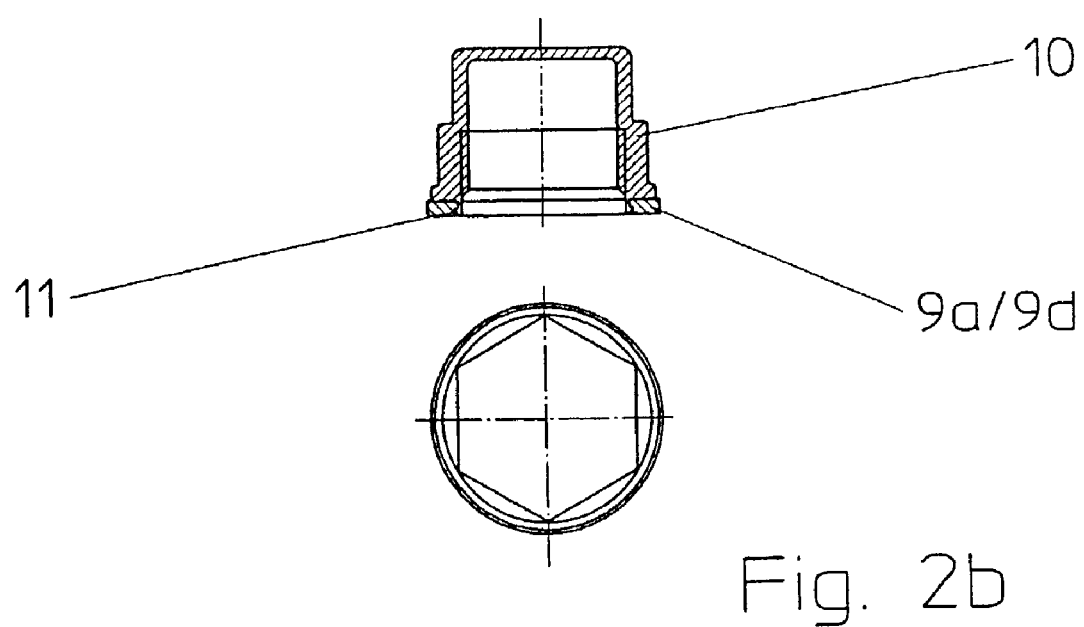
FIG. 2b is a sectional view and a plan view of a screw cap in accordance with aspects of the invention.

FIG. 2 shows a section through the end pole (FIG. 2a) and the screw cap 10 (FIG. 2b), which is connected to the corresponding cable lug 9a, 9d. On its outer surface, the end pole 3 has a threaded sleeve 3a, in a manner known per se, and which is composed, for example, of lead-plated brass. A pole cap 4 is placed on the end pole 3 and connected in an interlocking manner to the end pole to ensure complete protection against direct contact. Pole cap 4 is designed to be electrically insulating at least in the area which is accessible from above, and is preferably completely composed of a hard plastic such as a thermosetting plastic or a filled polypropylene. The diameter of the annular cable lug 9a, 9d corresponds to the diameter of the respective end pole 3 and the contact surface 3b provided for the cable lug 9a, 9d. Screwing the screw cap 10 tight results in the annular cable lug 9a or 9d, which is attached to it in a captive manner by an annular groove or integrally formed attachment claws 11, being pushed into the circumferential gap between the end pole 3 and the cylindrical contact protection device 5, onto the end pole 3. The captive screw cap 10 is composed of insulating material, for example of a hard plastic such as a thermosetting plastic or filled polypropylene, at least in the part which faces away from the cable lug, and has an internal metallic screw thread.

The cable lugs 9a and 9d are provided with connections 9e and 9f whose widths are chosen to be different for the positive and negative cable connections to avoid the positive and negative cables 9 from being incorrectly connected to the associated end pole. These widths correspond to the widths, which are likewise different, of the slots 6a and 6b in the contact protection device 5.

The protection against incorrect connection of the cables 9 can also be achieved by the end poles 3 having different diameters, which correspond with holes of different widths in the cable lugs 9a and 9d. The greatest protection is achieved if both measures are combined and, for example, an end pole 3 with a relatively small diameter is combined with a narrow slot 6a or 6b in the contact protection device 5, and an end pole 3 with a relative large diameter is combined with a broader slot 6a or 6b in the contact protection device 5.

Apart from a cable lug 9a or 9d being clamped as described above, the electrical connection can also be produced by means of a plug connection. In this variant, there is no need for the external thread on the end pole 3. The electrical contact surface of the end pole 3 can advantageously be provided with a structured pattern on the surface, for example by means of circumferential grooves.

At least one of the cable lugs 9a or 9d or a plug connector can preferably be combined with an additional appliance. Installation space can be provided in the structure of the cover 1 for this appliance. Thus, for example, a battery isolating switch 9b can be provided, which is positioned in a cutout 1a in the cover 1 by means of guide ribs 1b, and which prevents interruption of the connection of an end pole 3 of the rechargeable battery to an electrical network when on load.

Battery isolating switch 9b can preferably be switched by operation of a pole cover 7, which can be attached to the cover 1 in a hinged manner. On the lower face, the pole cover 7 may have an integrally formed pin 8 for switch operation, which can engage in a switching opening 9c in the battery isolating switch 9b. However, a non-contacting mechanism is also feasible, for example, with a magnet attached to the cover and a reed relay in the battery isolating switch 9b.

The pole cover 7 can be locked in the closed state via snap-action hooks 7a on the cover 1. However, the rechargeable battery can also be disconnected by operating the battery isolating switch 9b via external sensors, by a vehicle power supply system controller, or by some other remotely arranged controller. The sensors may, for example, be temperature sensors, overcurrent sensors or accident sensors. A vehicle power supply system controller evaluates measured physical variables. The rechargeable battery is disconnected, for example, as a function of the value of the state of charge (SOC), of the value of the state of health (SOH), or of other derived variables.

The invention claimed is:

1. A starter battery for a motor vehicle comprising:
    a housing for the starter battery;
    a cover associated with the housing and comprising filling openings for introducing electrolyte into the housing;
    positive and negative electrodes arranged in the housing;
    separators located between the electrodes;
    at least one end pole arranged on the cover and associated with one of the electrodes; and
    a contact protection device comprising a rotatable wall surrounding the end pole and comprising insulating material, the contact protection device being substantially cylindrical and having at least one vertical slot in the rotatable wall sized and shaped to receive a connecting cable;
    wherein the contact protection device is held in a mounting ring connected to the cover such that the contact protection device is freely rotatable around the end pole to allow repositioning of a battery cable connected to the end pole when the contact protection device is held in place by the mounting ring.

2. The battery as claimed in claim 1, further comprising an electrically insulating pole cap covering the end pole.

3. The battery as claimed in claim 1, wherein the contact protection device is attached by attachment claws integrally formed on a cover associated with the housing.

4. The battery as claimed in claim 1, further comprising a threaded sleeve on the end pole.

5. The battery as claimed in claim 1, further comprising an electrically insulating screw cap adapted to be screwed onto the threaded sleeve.

6. The battery as claimed in claim 5, wherein the screw cap is composed of a hard plastic material and has an internal metallic screw thread.

7. The battery as claimed in claim 1, wherein the contact protection device has slots of different width on positive and negative end poles.

8. The battery as claimed in claim 7, wherein the positive and negative end poles have different diameters.

9. A starter battery for a motor vehicle comprising:
    a housing for the starter battery;
    a cover associated with the housing and comprising filling openings for introducing electrolyte into the housing;
    attachment claws integrally formed on said cover;
    positive and negative electrodes arranged in the housing;
    separators located between the electrodes;
    at least one end pole arranged on the cover and associated with one of the electrodes; and
    a contact protection device comprising a rotatable wall surrounding the end pole and comprising isolating material, the contact protection device being attached by said attachment claws and having at least one vertical slot in the rotatable wall sized and shaped to receive a connection cable, wherein the contact protection device is freely rotatable around the end pole to allow repositioning of a battery cable connected to the end pole when the contact protection device is held in place by the attachment claws.

10. The battery as claimed in claim 9, further comprising an electrically insulating pole cap covering the end pole.

11. The battery as claimed in claim 9, further comprising a threaded sleeve on the end pole.

12. The battery as claimed in claim 11, further comprising an electrically insulating screw cap adapted to be screwed onto the threaded sleeve.

13. The battery as claimed in claim 12, wherein the screw cap is composed of a hard plastic material and has an internal metallic screw thread.

14. The battery as claimed in claim 9, wherein the contact protection device has slots of different width on positive and negative end poles.

15. The battery as claimed in claim 14, wherein the positive and negative end poles have different diameters.

* * * * *